July 17, 1928.
J. A. KINNEY
1,677,238
AUTOMATIC POINTING AND THREADING MACHINE
Filed Dec. 9, 1921    2 Sheets-Sheet 1
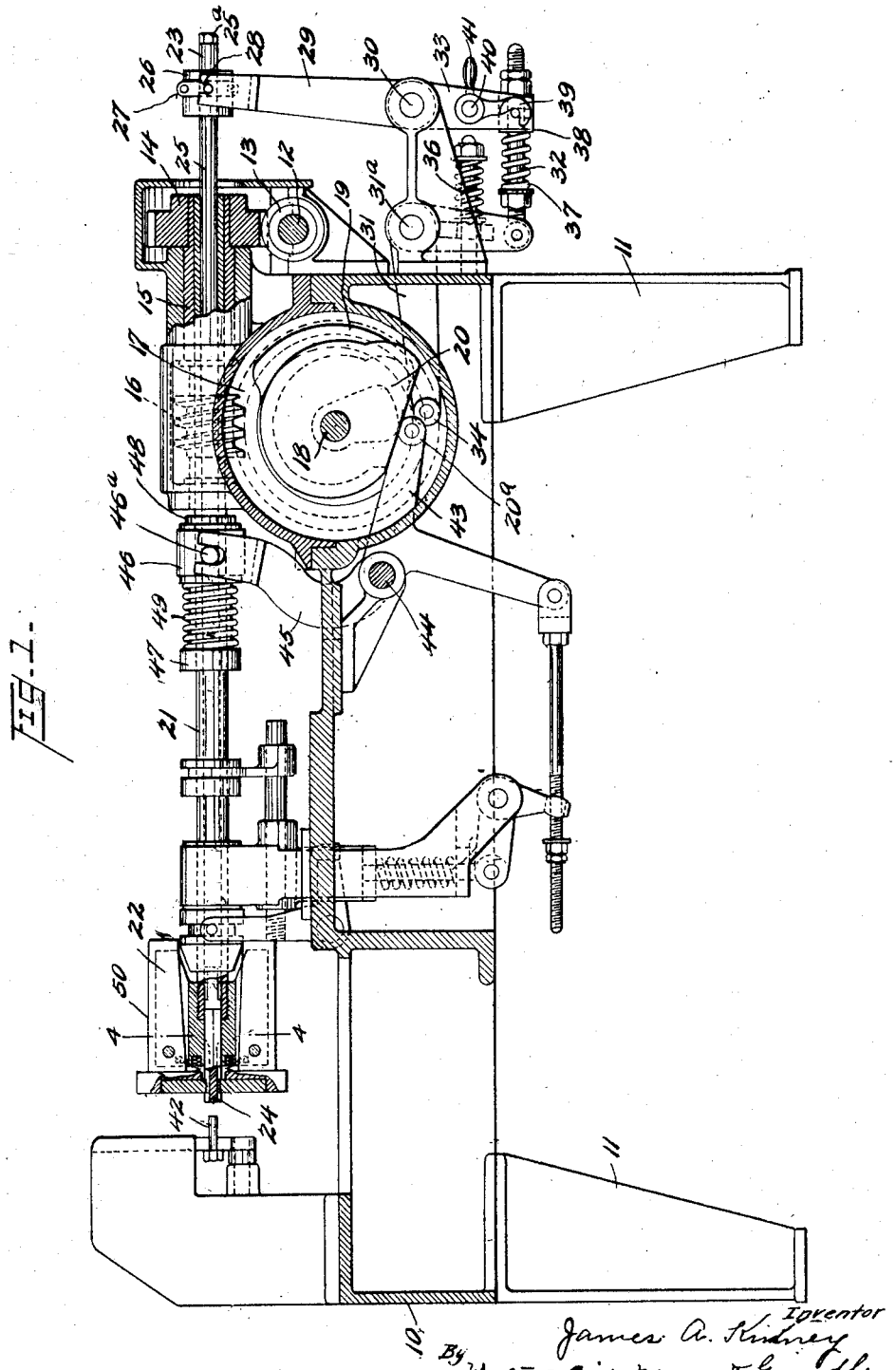

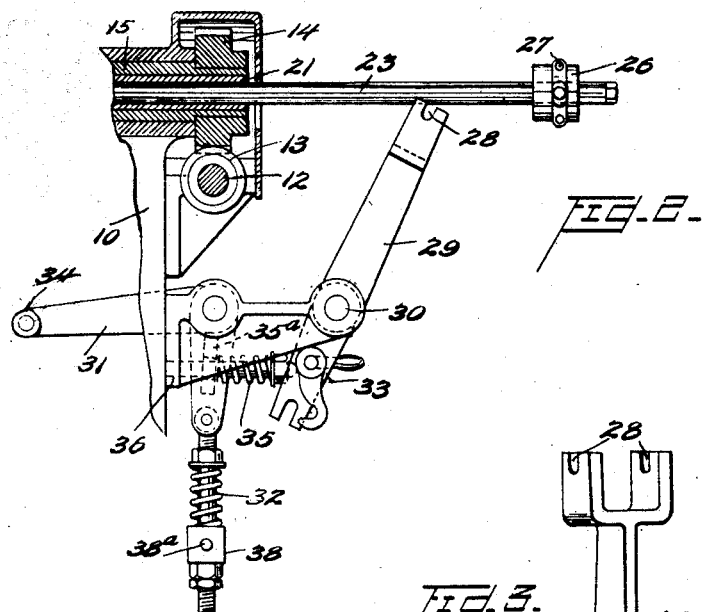
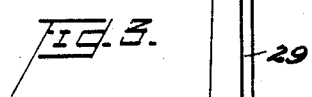
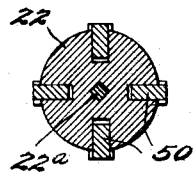

Patented July 17, 1928.

1,677,238

UNITED STATES PATENT OFFICE.

JAMES A. KINNEY, OF LEBANON, PENNSYLVANIA, ASSIGNOR TO BETHLEHEM STEEL COMPANY, OF BETHLEHEM, PENNSYLVANIA, A CORPORATION OF PENNSYLVANIA.

AUTOMATIC POINTING AND THREADING MACHINE.

Application filed December 9, 1921. Serial No. 521,218.

This invention relates to a mechanism for automatically pointing and threading bolts.

Briefly, the objects of the invention are; to provide an arrangement of bolt threading machine whereby a bolt is automatically threaded and pointed while held in one position, that is, during the same setting; to provide driving means whereby the threading and pointing tools are rotated by a common spindle; and to provide means which allows the pointing tool to be quickly and easily removed without dismantling parts, so that the necessary frequent removal of the tool for sharpening or dressing may be accomplished with a minimum loss of time.

Other novel features of construction and advantages will hereinafter clearly appear from the detailed description of the invention taken in connection with the accompanying drawings, in which:

Figure 1 is a section through a bolt threading machine with the present improvement embodied therein, the threading and pointing tools occupying their rearward position;

Figure 2 is a partial section of the rear portion of the pointing attachment showing the pointing tool released and partially removed from the machine;

Figure 3 is a perspective view of the lever which connects the pointing tool with its actuating mechanism; and Figure 4 is a cross-section on line 4—4 of Figure 1, showing the driving connection between the threading spindle and the pointing tool.

Referring to the drawings in detail, the machine consists of a frame 10 mounted on legs 11. On this frame in suitable bearings is mounted a main driving shaft 12 rotated by any well known means. Keyed to rotate with this shaft is a spiral gear 13 meshing with a corresponding gear 14 keyed to the end of a sleeve 15 disposed above and at right angles to the said driving shaft, said sleeve being rotatively mounted in suitable bearings attached to the frame 10 and having thrust bearings to prevent its longitudinal movement. Integral with or rigidly attached to the sleeve 15 is a worm 16 which meshes with a worm wheel 17 fixedly mounted on a cam shaft 18. The latter is arranged transversely of the frame 10 and is mounted to rotate in suitable bearings attached to the frame. The cam shaft 18 has fixedly mounted on it cam disks 19 and 20, the purpose of which will be hereinafter described.

Aligned with the sleeve 15 and slidingly mounted therein is the end of a hollow spindle 21 rotatively and slidingly mounted in bearings attached to the frame. The sleeve 15 and the spindle 21 are splined or otherwise secured together to prevent their relative rotation, so that while the spindle may slide in the sleeve it is compelled to rotate therewith. This spindle 21 has at its forward end a cutting die head 22 fixedly attached to rotate with it and such spindle is bored centrally through its entire length to receive the pointing tool 23, which is arranged co-axially with the spindle and which is of greater length than the spindle, thus allowing the pointing tool to project beyond either end of the spindle. The head 22 is bored centrally, the aperture 22$^a$ being non-circular in cross section and preferably being square, as shown in Figure 4, to engage the end of the pointing tool, which is also preferably of square cross-section for a short distance from its cutting end, the rest of the tool being preferably cylindrical in form. If desired the bore of the spindle adjacent the head may also be square in cross-section to correspond with the square bore of the head. By forming the bore of the head and, if desired, the bore of the spindle and the end of the pointing tool of squared cross-section a rigid driving means between the spindle and the pointing tool is provided which permits independent axial movement of such parts. It will be understood that the pointing tool 23 is thus caused to rotate by rotation of the spindle 21 and the head 22.

Preferably the pointing tool is constructed of several parts, the cutting end piece 24 being made of high grade steel known as tool steel, and shaped and fluted to cut the end of a bolt. This end piece 24 is of square cross-section as heretofore stated and is of such length as to engage the aforementioned squared aperture in the head 22. The shank 25 of the pointing tool is of that grade of steel generally used in machine construction, and is rigidly attached to the cutting end 24 by threaded engagement. A hexagon portion 25$^a$ is formed on the rear end of the shank 25 of the pointing tool to receive a wrench which may be applied when the cutter end 24 is gripped in a vise jaw to assemble said parts together.

Mounted on the shank 25 is a fixed collar 26 having an annular groove which rotatively receives a trunnion ring 27 having trunnions radially projecting therefrom and coaxial with each other, which engage in open ended slots 28 formed in the bifurcated end of the vertical lever 29 which is provided with a boss 29ᵃ pivoted at 30 to a bracket attached to the frame 10. The lever 29 operates to advance and retract the revolving pointing tool and is actuated by the aforementioned cam disc 19, through a lever system comprising a bell crank lever 31, a yielding connecting rod 32, and a pair of arms 33 integral with the boss 29ᵃ of the lever 29 and extending therefrom directly opposite the said lever. A roller 34 is rotatively mounted on a pin projecting from the face and at one end of an arm of the bell crank lever 31 which lever is rotatively mounted on a shaft 31ᵃ supported by the bracket which supports the lever 29. The roller is kept in contact with the cam surface formed on the cam disc 19 by pressure of the coil spring 35 bearing against a web 35ᵃ integral with and extending at right angles from the face of the other arm of the said lever 31. The other end of the coil spring 35 bears against an adjustable collar connected to the end of a post 36 extending from the frame, the post being surrounded by said spring 35 and passing through an aperture in the aforementioned web; this aperture being of larger diameter than the post does not impede the rotary motion of the crank lever 31. The rod 32 is pivotally connected at one end to the bell crank lever 31 and is threaded substantially its entire length to receive two adjustable collars which are normally spaced apart. A coiled spring 37 and a trunnion block 38 are mounted on the rod 32 and disposed between the last mentioned adjustable collars, the block 38 having trunnions 38ᵃ projecting therefrom and engaging the open ended slots formed in the end of the arms 33 of the lever 29. These trunnions are of sufficient length to project beyond the face of arms 33 and a pair of latches 39 keyed to the shaft 40 journaled in the arms 33 swing one on each outer side of the latter, to normally support these projecting ends and keep the trunnions in engagement with said arms, as shown in Figure 1. These latches are hook-shaped and the trunnion supporting surface is circumferential with the axis of rotation, so that an angular movement applied at the handle 41 integral and at right angles to the shaft 40 removes the supporting latches 39 from the trunnions 38ᵃ. The trunnions are then disengaged from the slots in the arms 33 and the rod 32 by reason of its pivotal connection with the bell crank lever 31 assumes the inoperative position shown in Figure 2. In this manner the lever 29 which is normally confined to an angular movement controlled by the throw of the crank lever 31 may be moved over withdrawing the pointing tool until the trunnion associated with the latter disengages the slots located in the upper end of the lever 29 so that said pointing tool may be withdrawn without further hinderance.

When the cam 19 is caused to rotate, the crank lever 31 is given a predetermined angular movement which reciprocates the rod 32. The forward adjustable collar threaded thereon presses against the end of the coil spring 37 which transmits motion to the trunnion block 38 thereby moving the arms 33, the lever 29 moving in unison with the latter, and this lever being engaged by the trunnions on the ring 27 advances the pointing tool toward the bolt blank indicated at 42. The coiled spring 37 provides a yielding means to relieve the jar imparted to the pointing tool when the latter advances against the end of the bolt blank. Any well known means mounted on the frame of the machine may be employed for feeding and holding the bolt blanks in a fixed position during the pointing and threading operation and a description of such means is thought unnecessary.

The cam disc 20 rotates with the cam disc 19 both being carried by the same shaft 18. The cam disc 20 is provided on one face with a cam groove which engages a roller 20ᵃ rotatively mounted on a pin at the end of and projecting perpendicular from the face of the arm 43 rigidly keyed to the shaft 44, the latter being journaled in bearings attached to the frame 10. Also rigidly keyed to shaft 44 is a vertical bifurcated lever 45 disposed centrally with reference to the spindle 21 which is straddled by the forked upper end of said lever. The upper end of the latter is slotted to receive two trunnions 46ᵃ which are aligned and project laterally from the periphery of a ring 46, rotatively mounted on the spindle 21, but limited in independent axial movement relative thereto by the thrust collars 47 and 48, yielding means being provided in the form of a coiled spring 49 interposed between forward thrust collar 47 and the ring 46 to prevent jar when the aforementioned cutter head 22 engages a bolt blank 42. The cam groove sunk in the face of the cam disc 20 retains the roller of the arm 43 except when the groove runs out on the periphery of said disc, but in this position the spindle 21 is in its rearward position and the collar 48 abuts the framework of the machine and supports said arm so that the roller is always within the radius of action of the cam faces.

Means are provided whereby the die jaws 50 are automatically opened and closed when the spindle arrives at its forward and rearward positions, respectively. This may be done by several means known to those versed in the art and while preferred means are shown as illustrated, it is not intended to be embodied in this invention, therefore a detailed description of such die operating mechanism is not considered necessary.

It will thus be understood that the spindle 21 while being rotated by engagement with the sleeve 15 is moved toward and from the work by the above-described mechanism operated by the cam disc 20 and that its movements are synchronized with the advancing and receding movements of the pointing tool 23 produced by the cam disc 19 as hitherto described, these cam discs being driven by a common shaft 18 on which they are mounted, and being so designed that the pointing tool advances ahead of the cutting head and points the blank and retracts as the cutting head engages said blank. The pointing operation occupies a comparatively short period and is easily performed while the said head advances to the work.

The apparatus thus described operates automatically to point and thread a bolt while the same is gripped and held in one position thus avoiding any change of position or double handling of the bolt being machined; the pointing tool can be easily and quickly withdrawn which, as heretofore stated, must be frequently done in order that the tool may be dressed; and the entire machine is comparatively simple and compact and is so arranged that the pointing and threading tools are driven from a single spindle.

Various modifications may, of course, be made in the details of the mechanism without departing from the spirit of the invention as defined in the appended claims.

Having thus described the invention what I claim as new and desire to secure by Letters Patent is:

1. In a machine for threading and pointing bolts, the combination of a hollow spindle, a threading tool carried by the spindle, a pointing tool, a shank connected to the pointing tool and extending through and beyond one end of the hollow spindle, a member having trunnions capable of relative rotative movement with respect to the shank but fixed against a longitudinal movement with respect thereto, said member being located beyond one end of the hollow spindle, a lever having a yoke provided with open-ended slots for engagement with the trunnions, and means for oscillating the lever including manually releasable means whereby said first means may be disconnected with respect to the lever so that the latter may be disengaged from the trunnions.

2. A machine for pointing and threading bolts comprising in combination, a frame, a hollow spindle mounted thereon and carrying a cutting head, a pointing tool arranged coaxially of said spindle and projecting beyond the rear end thereof, means for rotating said spindle and tool, means operated by the first-named means for moving said tool axially of the spindle, said tool moving means including a lever detachably connected to said projecting portion of the pointing tool, an oscillatory arm member, a link hinged to said arm member adapted to engage said lever, and a latch pivoted to said lever adapted to engage said link.

3. A machine for pointing and threading bolts comprising in combination a frame, a hollow spindle mounted thereon and carrying a cutting head, a pointing tool arranged coaxially of said spindle and projecting beyond the rear end thereof, means for rotating said spindle and tool, means operated by the first-named means for moving said tool axially of the spindle, said tool moving means including a lever detachably connected to said projecting portion of the pointing tool, means to rock said lever comprising a hinged link and a resilient member adapted to be interposed intermediate said link and said lever, and a releasable latch adapted to maintain said link in effective engagement with said lever.

In testimony whereof I hereunto affix my signature.

JAMES A. KINNEY.